United States Patent Office 3,471,553
Patented Oct. 7, 1969

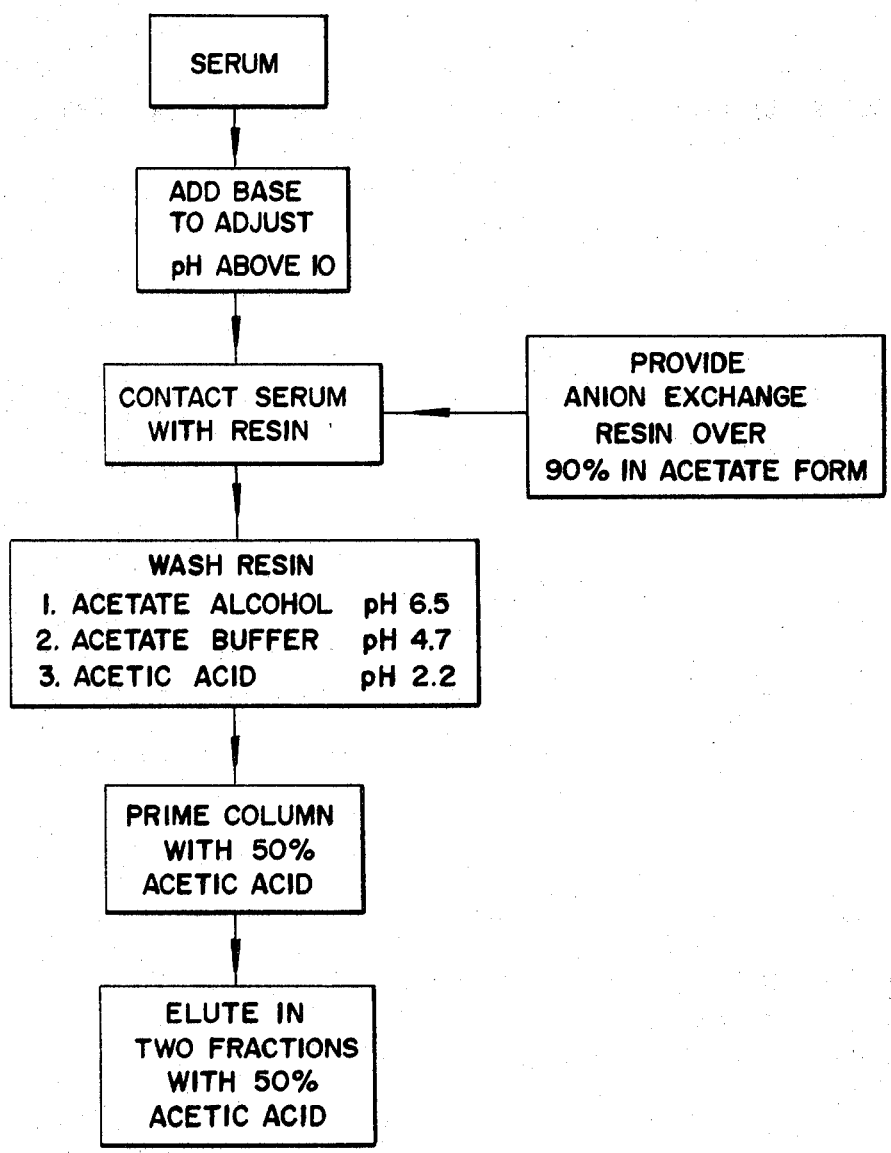

3,471,553
METHOD FOR DETERMINATION OF PROTEIN-BOUND IODINATED COMPONENTS
Donald L. Bittner, 1945 Pacific Ave.,
San Francisco, Calif. 94109
Filed Sept. 15, 1967, Ser. No. 668,083
Int. Cl. C07c *99/12, 99/02*
U.S. Cl. 260—519                                     14 Claims

ABSTRACT OF THE DISCLOSURE

Analysis for serum thyroxine by selective adsorption of serum on an ion exchange resin in which the eluate is obtained in a relatively small volume. The small volume is obtained by adjustment of the serum pH to the alkaline range, preferably pH 12–13, prior to adsorption of the sample on the ion exchange resin. Best results are obtained where the ion exchange resin employed is an anion exchange resin in over 90% acetate form.

---

This invention relates to the determination of protein-bound iodinated components. In a preferred embodiment the invention provides a method for determination of serum thyroxine (T–4) by adsorption of the thyroxine on an anion exchange resin column and elution of the thyroxine therefrom in a relatively small volume of acetic acid.

Butanol-extractable iodine is commonly used for indirectly estimating serum thyroxine. Frequently precise and quantitative values can not be obtained in specimens because of contamination by organic or inorganic iodide. The isolation and elution of thyroxine on an anion exchange resin was therefore suggested as a technique for avoiding the problems contributed by contamination. In J. Clin. Endocr. and Meta., 21:1272, 1961, Pileggi et al. demonstrated a good correlation of the anion exchange resin determination of thyroxine with butanol-extractable iodine. The anion exchange resin method was shown to be more reliable in the presence of some organic contaminants.

All such prior methods using anion exchange resins for the determination of thyroxine have in common the disadvantage of requiring large volumes of eluate and an acetic acid evaporation phase prior to the iodine analysis of thyroxine. The present invention advances these prior techniques and is designed to yield a relatively small volume eluate generally containing more than 95% of the serum thyroxine initially isolated on the anion exchange resin. Whereas the prior methods such as reported in the above cited Pileggi et al. article include elution volumes comprising three 10 milliliter fractions for a total of 30 mls., the preferred embodiment of the present invention employs two 3 ml. fractions to provide a total elution volume of only 6 mls.

The advantages of the small elution volume are realized in terms of economy of reagents and supplies. Using smaller volumes makes it possible to economically employ small disposable analytical vessels such as a column which may be used to retain the anion exchange resin. In addition, the end results may be more accurate in that the concentration of thyroxine is not unduly diluted so as to make detection and quantitation more difficult. Of much practical consequence, the present method offers a dilution that is adaptable for use with automated analytical equipment. The dilutions previously obtained were too great for automated processing.

In the practice of the preferred embodiment of this invention serum thyroxine, predominantly T–4 but including T–3, tri-iodothyronine is initially adjusted in pH preparatory to adsorption on the ion exchange resin. In contrast with the prior art which has utilized the serum at an acidic pH, the present invention is practiced by adjusting the serum to an alkaline condition. It has been discovered that if the serum is initially made sufficiently alkaline to promote hydrolysis of T–4 from thyroxine-binding protein, the T–4 can be substantially quantitatively adsorbed on a relatively smal amount of resin which will subsequently require only a relatively small volume, for example less than about 10 mls. for elution of the adsorbed thyroxine. In general, the advantages of the invention are obtained by adjusting the serum pH to an alkaline pH about above 10 and most preferably to a pH of about 12–13.

In another aspect of the invention small elution volumes are made possible by proper selection of the anion exchange resin. In this regard, it has been found that substantially smaller resin quantities can be used to effectively adsorb thyroxine and thereafter the adsorbed thyroxine can be eluted therefrom in small elution volumes, if the anion exchange resin is formed from a matrix having a replaceable anion in which at least 90% of the exchange capacity of the resin matrix is fulfilled with said anion. Consistent with prior resins, the matrix should have less affinity for the exchangeable anion than for the anionic form of the iodinated protein-bound components such as thyroxine to be adsorbed by the resin. The use of such a resin represents a departure from previously used anion exchange resins in that it has been the practice to use resins having a maximum of 60% of exchangeable anion that is replaceable by thyroxine.

The accompanying drawing is a flow sheet illustrating the practice of the preferred embodiment of the present invention.

Whereas the invention may be practiced on a batch basis, the following discussion is related to a column technique. It will be appreciated that the same general conditions apply to both procedures.

With reference to the drawing, a sample of serum to be analyzed for thyroxine iodine is provided. The serum is adjusted in pH to above 10, preferably in the range 12–13. The addition of a strong base such as potassium hydroxide, sodium hydroxide or ammonium hydroxide is suitably used for this step. A convenient workable dilution volume is obtained by adding 10 volumes of .1 N sodium hydroxide to one volume of serum. This will provide the desired alkaline pH.

In such an alkaline environment the serum thyroxine can be adsorbed on a small ion exchange column. For example, it has been found that a column of resin $\frac{5}{16}''$ x $1''$ having an average resin mesh size of about 100–200 is capable of adsorbing over 95% of the protein-bound iodinated components in 1.5 ml. of serum.

As noted, for optimum results a specially prepared anion exchange resin is utilized. Previously, a typical anion exchange resin such as Dowex–1, X–2 was prepared for analysis by washing with 50% acetic acid to replace the initially occurring chloride ions. In such a procedure a maximum of 60% of the chloride is replaced by acetate. In accordance with this invention, optimum results are obtained by using an anion exchange resin in over 90% acetate form, i.e. more than 90% of the chloride is replaced by acetate. Such a material is available from Bio-Rad Laboratories, Richmond, Calif., under the name Bio-Rex T–4 anion exchange resin.

Whereas the preferred embodiment is practiced with an anion exchange resin over 90% in acetate form, the invention contemplates the use of any anion exchange resin containing over 90% of its exchange capacity of an anion replaceable by protein-bound iodine components in the serum being analyzed. Thus, instead of acetate other anions such as formate could be present in the resin so long as the resin matrix has less affinity for the anion than for the anionic form of the iodinated protein-bound components to be adsorbed.

In addition to having anions replaceable by thyroxine, the resin matrix should have a great affinity for inorganic iodine so that any inorganic iodine is retained by the resin through both the washing and elution steps to be described.

The preferred resin matrix to be used in this method is a Type I matrix which may be formed from quaternary ammonium and polystyrene. Other resin matrix types such as that known as Type II are contemplated provided they contain the exchangeable anion and relative affinities to the extent indicated.

Preferably the selected anion exchange resin is preliminarily equilibrated with a suitable reagent to prepare it for the alkaline serum. A .2 N sodium acetate solution is convenient for this step. The alkaline serum is then contacted with the resin and the protein-bound iodine components adsorbed thereon. With the use of the resin in column form the serum solution is simply poured through the column.

The resin is then washed prior to elution of T–4 (and T–3). The exact volume of wash solutions used are not particularly critical. They are generally selected for efficient removal of mono- and di-iodotyrosines. A convenient wash of two portions of each solution shown in the accompanying drawing is suggested for each wash step so that the next wash step will not be diluted by the fluid in the resin bed volume. For a $5/16''$ x $1''$ column, 7.5 ml. aliquots of the wash solutions have been found to be satisfactory.

In the first wash, an acetate solution containing a water-miscible alcohol such as isopropyl alcohol is preferably utilized. During the adsorption and washing steps, carbon dioxide is liberated from the serum bicarbonate by acetate. The alcohol serves to remove carbon dioxide trapped by the resin and improves the smoothness of flow and effectiveness of the elution step to follow. A suitable acetate-alcohol wash may have a pH of about 6.5 and can be made from equal volumes of .2 N sodium acetate and isopropyl alcohol. Appropriate pH adjustment can be made with the addition of concentrated acetic acid.

The second wash comprising an acetate buffer of pH 4.7 can be made from equal volumes of .2 N sodium acetate and .2 N acetic acid.

The third wash of acetic acid of pH 2.2 is conveniently prepared from .2 N acetic acid. These washing steps are generally designed to remove proteins, iodotyrosines and miscellaneous contaminants.

When employing a resin column, the preferred technique after washing is to first move the adsorbed thyroxine to the bottom of the column before actually removing any from the column. This "priming" step assists in removing the thyroxine with a minimum elution volume. Preferably the thyroxine is moved down the column with acetic acid. Since it is known that acetic acid of over 40% concentration will cause elution, a concentration and volume of acetic acid is selected which will move the adsorbed thyroxine to the bottom of the column but not outwardly therefrom. A 50% by volume concentration of acetic acid has been found to be effective for a column size of the magnitude indicated. With such a column it has been found that .5 ml. of concentrated acetic acid is advantageous for the priming step, the bed volume of the column serving to dilute the acetic acid to approximately 50%.

The elution step is then preferably executed in two fractions with 50% acetic acid. Again using a column of the size indicated, two 3.0 mls. fractions of acetic acid has been found to produce the desired elution. In any even the total elution volume is preferably less than about 10 mls. In the case of the two 3 mls. fractions, there is sufficient concentration so that the eluate may be analyzed by automatic digestion technique such as employed with the instruments manufactured by Technicon Instruments Corp. of New York. Standard colorimetric methods for iodine analysis can of course also be used.

By using two fractions for the elution, a check against contamination or other error source in the test is provided. It has been found that under the conditions described approximately 90% of the thyroxine is obtained in the first fraction and 10% in the second fraction. Where the results vary significantly from this relationship, an error is suggested.

As a further check against error, a preselected quantity of thyroxine labeled with radioactive iodine can be added to the serum sample. Its quantitative presence in the two elution fractions in the expected ratio can be determined by the usual methods such as by the use of a scintillation counter. Deviations from the expected recovery pattern again suggest an error.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. In the method for separating thyroxine from serum by selective adsorption on an anion exchange resin, the improvement comprising adding base to the serum to make it sufficiently alkaline to promote hydrolysis of T–4 from thyroxine binding protein, and thereafter contacting said alkaline serum with the anion exchange resin.

2. The method in accordance with claim 1 wherein sufficient base is added to the serum to adjust the pH to above about 10.

3. The method in accordance with claim 2 wherein sufficient base is added to the serum to adjust the pH to about 12–13.

4. An improved ion exchange method for the determination of selected iodinated protein-bound components in serum consisting of T–3 and T–4 comprising: providing an anionic exchange resin formed from a matrix having an exchangeable anion, said matrix having less affinity for said anion than the anionic form of said iodinated protein-bound components, said matrix having at least 90% of its exchange capacity fulfilled with said replaceable anion; and contacting said resin with iodinated protein-bound components in an alkaline medium to adsorb the same onto the resin, whereby said adsorbed iodinated components can be eluted from the resin with a relatively small volume of acidic eluting liquid.

5. An improved method in accordance with claim 4 wherein said resin matrix is a Type I quaternary ammonium structure.

6. An improved method in accordance with claim 4 including the step of eluting the selected adsorbed iodinated components with a volume of acidic eluting liquid of less than about 10 milliliters.

7. An improved method in accordance with claim 6 wherein the liquid used for elution is acetic acid and the elution is executed in two fractions.

8. An improved method in accordance with claim 4 and including the step of washing the resin containing adsorbed iodinated components with an acetate wash containing a water-miscible alcohol for removal of carbon dioxide gas from the resin preparatory to elution of the selected iodinated components from the resin.

9. An improved method in accordance with claim 8 wherein the resin is confined in a column for passage of fluid therethrough and including the step of priming said column after washing, but before elution of iodinated components therefrom by flowing acetic acid through said column in a volume and concentration selected to move adsorbed components to the bottom of the column but not outwardly therefrom.

10. An improved method in accordance with claim 4 and including the step of adjusting the pH of said iodinated protein-bound components to above about 10 before adsorbing them on said resin.

11. The method in accordance with claim 1 wherein said anion exchange resin is confined in a column for passage of fluid therethrough and said contact with said alkaline serum is executed by flowing the alkaline serum through said column, and thereafter priming said column before elution of T–4 therefrom by flowing acetic acid through said column in a volume and concentration selected to move adsorbed T–4 to the bottom of the column but not outwardly therefrom.

12. An improved chromatographic method for determining serum thyroxine comprising: providing a chromatographic column containing anion exchange resin, flowing serum through said column in contact with the anion exchange resin therein to selectively adsorb serum thyroxine on said resin, said contact between the serum and resin being executed at an alkaline pH of above about 10.

13. An improved chromatographic method in accordance with claim 12 wherein said alkaline pH is about 12–13.

14. An improved chromatographic method in accordance with claim 12 and including the step of eluting the thyroxine adsorbed on said resin with a total elution volume of less than 10 milliliters.

References Cited

Pileggi et al., Journal of Clinical Endocrinology and Metabolism, vol. 21 (1961), pages 1272 to 1279 relied on.

LORRAINE A. WEINBERGER, Primary Examiner

L. ARNOLD THAXTON, Assistant Examiner

U.S. Cl. X.R.

210—37